United States Patent [19]

Yeh et al.

[11] Patent Number: 4,970,638
[45] Date of Patent: Nov. 13, 1990

[54] CONTROL OF UNKNOWN SYSTEMS VIA DECONVOLUTION

[75] Inventors: Hsi-Han Yeh, Fairborn; Siva S. Banda; Paul J. Lynch, both of Dayton, all of Ohio

[73] Assignee: United States of America as represented by the Secretary of the Air Force, Washington, D.C.

[21] Appl. No.: 265,383

[22] Filed: Oct. 31, 1988

[51] Int. Cl.$^5$ .................. G06F 15/46; G05B 13/04
[52] U.S. Cl. .................. 364/150; 364/157; 364/553
[58] Field of Search .................. 364/149–151, 364/553, 157–159, 724.19, 724.2, 724.01, 728.01; 318/561

[56] References Cited

U.S. PATENT DOCUMENTS

| | | | |
|---|---|---|---|
| 361,394 | 1/1968 | Pfersch | 244/77 |
| 3,795,799 | 3/1974 | Courtiol | 235/150.1 |
| 3,973,112 | 8/1976 | Sloane | 364/553 |
| 4,437,045 | 3/1984 | Mitsuoka | 318/561 |
| 4,451,787 | 5/1984 | Shigemasa | 364/553 X |
| 4,577,270 | 3/1986 | Sugano et al. | 364/151 |
| 4,639,853 | 1/1987 | Rake et al. | 364/149 |
| 4,663,704 | 5/1987 | Jones et al. | 364/188 |
| 4,811,261 | 3/1989 | Kobayashi et al. | 364/553 X |
| 4,849,925 | 7/1989 | Peckerar et al. | 364/819 |

OTHER PUBLICATIONS

Depeyrot–"Linear System Identification Using Real–Time Deconvolution"–IEEE Trans. on Computers––Dec. 1970–pp. 1139–1145.

Yeh et al.–"An Impulse-Response Adaptive Control System"–AIAA Guidance Navigation and Control Conference; Monterey, Calif., 8/87, pp. 1–10.

Yeh et al.–"Control of Unknown Systems via Deconvolution"–26th IEEE Conf. on Decision and Control, Los Angeles, CA, 12/87, pp. 1–3.

AFWAL-TR-85-3113 Basic Research On Adaptive Model Algorithmic Control Larimore et al., Dec. 1985, Scientific Systems, Inc., Cambridge, MA 02140.

Primary Examiner—Joseph Ruggiero
Attorney, Agent, or Firm—Bernard E. Franz; Donald J. Singer

[57] ABSTRACT

The controller is a logical network which, when interfaced with a mechanical system or an electromechanical system, will cause the output variable of the system to closely follow any command signal received. It comprises shift registers, memory banks, accumulators, arithmetic units and preferably no software. Universal Controller keeps the error between the output of the model and the output of the control system small, regardless of the transfer function of the controlled system by adjusting a number of gains in its internal feedback loop in accordance with that error. It therefore can be applied to an arbitrary electromechanical system without prior knowledge of its transfer function.

4 Claims, 2 Drawing Sheets

CONTROL OF UNKNOWN SYSTEMS VIA DECONVOLUTION

RIGHTS OF THE GOVERNMENT

The invention described herein may be manufactured and used by or for the Government of the United States for all governmental purposes without the payment of any royalty.

BACKGROUND OF THE INVENTION

The present invention relates generally to a Universal Controller, for control of unknown systems via deconvolution; or more particularly to a logical network, which when interfaced with a mechanical system or an electromechanical system, will cause the output variable of the system to closely follow the output of a model system driven by the same command signal that the Universal Controller receives.

Model reference control algorithms are synthesized on the basis that the plant may be described by a transfer function with unknown coefficients. A basic assumption under which the stability of these algorithms is proven is that the order of the plant transfer function be known.

The uncertainty in the coefficients or parameter values of a transfer function of a given order may be referred to as structured uncertainty. Most practical systems have high frequency plant dynamics which cannot be described by transfer functions of a given order for any values of the parameters. These high frequency dynamics are called unmodeled or unstructured dynamics. Unmodeled dynamics affect the performance of model reference adaptive control systems in a peculiar way. Recent studies (C. E. Rohrs et al, "Robustness of Continuous-Time Adaptive Control Algorithms in the Presence of Unmodeled Dynamics" IEEE Transactions on Automatic Control Vol AC-30, pp 881–889, Sept. 1985) show that in the presence of unmodeled dynamics, a model reference adaptive control system becomes unstable if the reference input contains a high frequency sinusoid. Instability also occurs of there is a sinusoidal output disturbance at any frequency including d.c. The latter poses a serious problem because sinusoidal disturbances are common and the problem cannot be alleviated by adding a low-pass filter at the output (Rohrs et al ibid.). A remedy for this problem is to add low frequency excitation of sufficient magnitude at the input (Rohrs et al ibid. and K. J. Astrom, "A Commentary on the C. E. Rohrs et al Paper . . . " IEEE Transactions on Automatic Control, Vol AC-30, pp 889, Sept. 1985). A recent study (J. Krause et al. "Robustness Studies in Adaptive Control", Proceedings 22nd, IEEE Conference Decision Control, San Antonio, Tex., Dec. 14–16, 1983, pp 977–981) also deals with the frequency range and the amount of excitation required to stabilize the adaptive control system in the presence of unmodeled dynamics and output disturbances.

Many practical systems (for example, flight control systems) exist where persistent excitation in the input signal is undesirable. Thus, the problem with unmodeled dynamics reduces the appeal or even precludes the application of adaptive control to such systems.

R. E. Kalman ("Design of a Self-Optimizing Control System" Transactions of ASME, Vol 80, pp 468–478, Feb. 1958) mentioned the idea of modeling a plant in terms of an impulse response sequence in the design of a self-optimizing control system. However, Kalman did not succeed in developing an adaptive controller based on on-line identification of impulse-response sequence of an unknown system. In the work of Kalman, the idea of impulse-response sequence was abandoned, and his control algorithm computes the coefficients of the rational transfer function of the unknown plant via a modified least square filtering procedure, which requires lengthy and involved calculations. Kalman's machine requires a considerable amount of programmed computation. Furthermore, in Kalman's design, the order of the plant must be known. Each machine is built for plants that are lower than certain order. The computation grows exponentially with the order of the plant. Because of the computation time involved, the usefulness of the Kalman machine is limited to low order plants and low-sampling frequency digitalization.

Control designs based on approximate impulse-response models have been developed. See R. K. Mehra et al. "Basic Research in Digital Stochastic model Algorithmic Control" Technical Report AFWAL-TR-80-3125; and W. E. Larimore & S. Mahmood, "Basic Research on Adaptive model Algorithmic Control", Technical Report AFWAL-TR-85-3113 (available from NTIS as AD-A168 016), both from Flight Dynamics Laboratory, Wright-Patterson Air Force Base, Ohio. Model Algorithmic Control (MAC), described in the Larimore & Mahmood Report, assumes that the unit-impulse response sequence of the controlled system (the plant) be known. The control variable is then computed from the desired output and the unit-impulse response sequence. The Adaptive MAC requires that the unknown plant be operated open-loop and off-line initially for seven seconds to enable its unit-response be identified. The impulse-response model is then used in the digital controller and the control loop is closed. A (random) dither signal and a measurement noise of sufficient magnitude and variance are deliberately introduced and superimposed on the actual input and output to enable the repeated identification of the plant's impulse response model every seven seconds. Thus, the Adaptive MAC cannot help being contaminated by an artificially introduced dither signal at the input and measurement noise at the output and at the feedback.

Jones et al in U.S. Pat. No. 4,663,704 show a universal process control device which combines both control and data acquisition functions. Rake et al in U.S. Pat. No. 4,639,853 teach an adaptive controller of a continuous time process which includes prediction and parameter estimation. In column 1 the Rake et al patent speaks of establishing a process model by known parameter estimation methods. Courtiol in U.S. Pat. No. 4,795,799 discloses a process control arrangement employing the deviation between the output vectors of a reference model and of the process employed. The process in this patent follows the reference model without it being necessary to know the relationship between the input variables and the output variables. Mitsuoka in U.S. Pat. No. 4,437,045 discusses a servo control system in which a reference model 2 is in parallel with a final control element 1. Adaptive control is obtained based upon the difference between the outputs of the final control element and the reference model. Pfersch in U.S. Pat. No. 3,361,394 controls an aircraft in response to gain adjusted error signals. Sumano et al in U.S. Pat. No. 4,577,270 et al control a plant with a model constructed using a Kalman filter.

SUMMARY OF THE INVENTION

An object of the invention is to provide a controller which is able to control a mechanical or electromechanical system whose transfer function is partially known, valuely known, or even unknown to the control designer, and may even vary with time.

The invention relates to a logical network (called Universal Controller) which, when interfaced with a mechanical system or an electromechanical system, will cause the output variable of the system to closely follow the output of a model system driven by the same command signal that the Universal Controller receives. It comprises shift registers, memory banks accumulators, arithmetic units and preferably no software.

Universal Controller keeps the error between the output of the model and the output of the controlled system small, regardless of the transfer function of the controlled system by adjusting a number of gains in its internal feedback loop in accordance with that error. It therefore can be applied to an arbitrary electromechanical system without prior knowledge of its transfer function. Hence, the name Universal Controller.

In the preferred embodiment, the Universal Controller involves no software or programmed computation. Therefore, the computation time required after each clock pulse is in the order of nanoseconds (the time required for a signal to pass through logical gates). This makes possible the application of the Universal Controller to any practical electromechanical system with fast sampling. The main feature of the Universal Controller is that it can be applied to an arbitrary electromechanical system with unknown transfer function. The Universal Controller will learn about the unknown system by adjusting the gains in its internal feedback loops in accordance with the difference between the system output and the model output, while keeping that error minimal at the same time.

Kalman's machine requires a considerable amount of programmed computation, and therefore the computation time required after each clock pulse is orders of magnitude greater than what is required of the Universal Controller.

The speed of the Universal controller enables it to control any mechanical or electromechanical system that has minimum phase and convergent unit-impulse response sequence. The potential uses are limitless. Examples include control of aircraft and spacecraft and their subsystems chemical and mechanical processes, nuclear reactors and manufacturing equipment. This technology has extremely broad applications.

DETAILED DESCRIPTION

Figure 1:
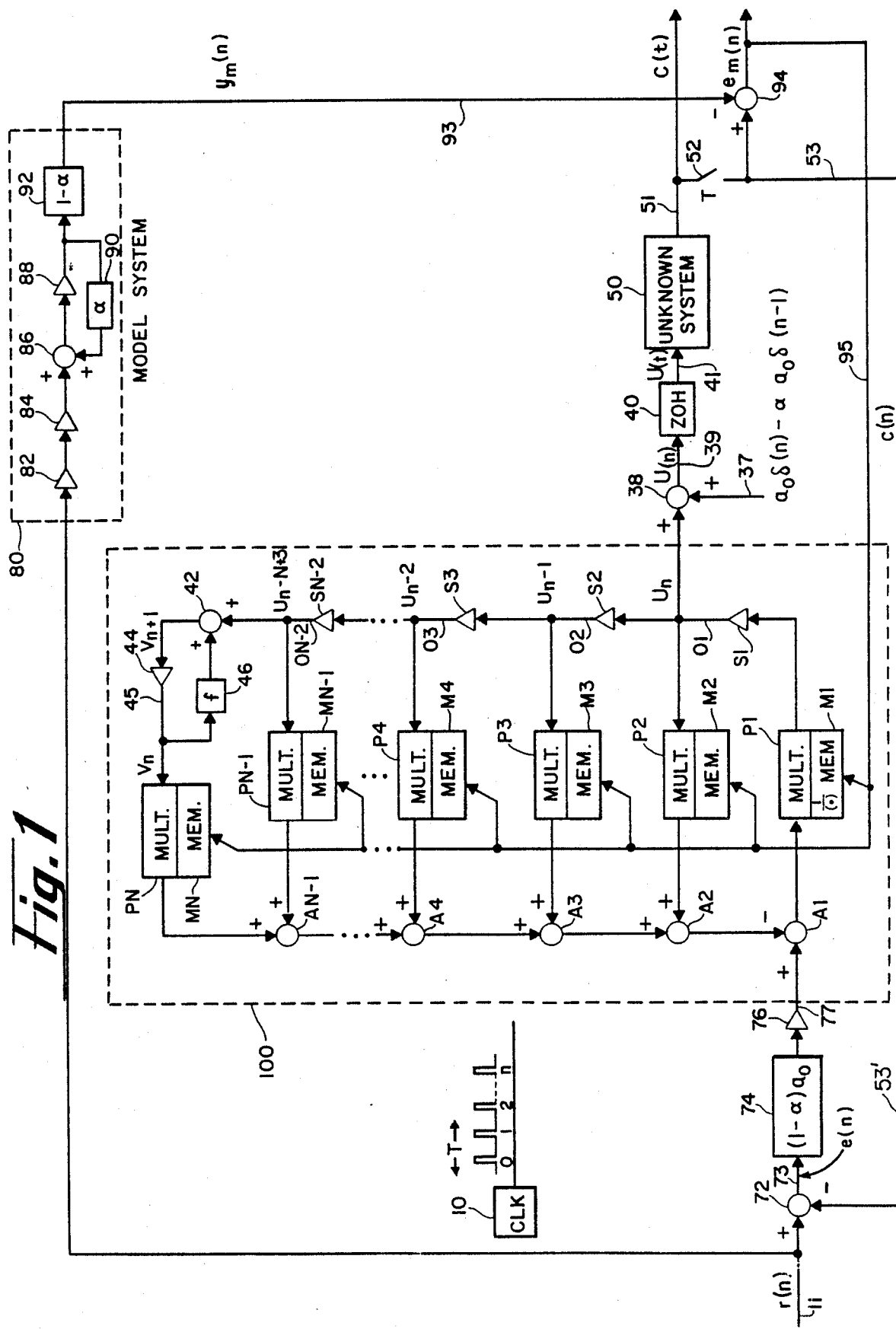
FIG. 1 is a block diagram showing the system configuration.

Application of the Universal Controller to a generic aircraft model has been simulated on a digital computer, with satisfactory results. The mathematical aircraft model used was a two-degree-of-freedom short-period approximation to the longitudinal dynamics of an air-to-air medium-weight tailess delta-winged configuration, a class to which the F-16XL belongs. The results were presented in a paper by Applicants (Yeh et al) titled "Control of Unknown Systems Via Deconvolution", presented at the 26th IEEE Conference on Decision & Control, Los Angeles, Calif., 9–11 Dec. 1987. A related system called Smart Controller by the same applicants is covered by a copending patent application Ser. No. 229,590, filed Aug. 8, 1988, and is described in a paper with the same authors titled "An Impulse-Response Adaptive Control System" presented at the AIAA Guidance, Navigation and Control Conference, Monterey, Calif., 17–20 Aug. 1987. The two papers and the related patent application are hereby incorporated by reference, and copies of the two papers are included with this application as filed.

The logical network (synchronous sequential network) describing the Universal Controller is shown given in the drawing, where an unknown system 50 is the plant to be controlled, and r(n): the discrete-time command
c(t): continuous-time system output
T: sampling period
ZOH: zero order hold
α: a parameter in the model system, between 0 and 1, to be selected by the user
$a_0$: a parameter directly proportional to output error may be arbitrarily selected by the user
δ(n): unit sample function (this function has a value equal to one only when n=0, otherwise the value of the function is zero)
f: a constant between 0 and 1 may be adjusted for each application
Δ: one period delay
N: number of memory storage for the deconvolution
$G_m(z)$: transfer function of the model
y(z): model output
$e_m(n)$: output error Universal Controller passes the feedback error $e(n) = r(n) - c(n)$ through an amplifier 74 and a delay unit 76 and uses a deconvolution generator 100 to deconvolute the resultant signal on line 77 with the model error on line 95 to give the optimal control variable (The gain of amplifier 74 is related to the starter signal on line 37 and a model system 80). This control signal on line 39 maintains the output error on line 95 at $$e_m(n) = = a_0[(g_n - g_{n-3}) - \alpha(g_{n-1} - g_{n-3})]$$

where $g_n$ is the nth element in the unit-impulse response of the unknown plant 50. Since most digital control systems are sampled at far greater rates than the natural frequencies of the controlled systems, $g_n - g_{n-3}$ and $g_{n-1} - g_{n-3}$ are small, and $g_n$ vanishes with increasing n if the uncontrolled system is stable. To reduce $e_m(n)$ further, the user may arbitrarily choose a smaller $a_0$, as long as the inverse of first nonzero element of the error sequence $e_m(n)$ is not so large as to preclude the implementation of the deconvolution generator 100. In this fashion, the Universal Controller makes the output of an arbitrary unknown system 50 follow the output of a model system 80 driven by the same command signal that the Universal Controller receives.

Note that while the unknown system 50 is analog, the Universal Controller is digital with the devices and the lines interconnecting them handling words with binary digits in parallel, a typical word length being sixteen or thirty-two binary digits, depending on the accuracy desired. A clock 10 is coupled to most of the devices of the controller to trigger their operation at intervals of T seconds. A typical value for T in avionics applications may be 40 milliseconds. Devices shown in the drawing as triangles (referred to as delay devices or shift register stages) provide a delay of one clock interval by storing a digital word at the beginning of an interval, and supplying that word at its output at the beginning of the next interval. Devices represented as circles are summing devices (adders or subtracters) which provide the arithmetic sum or difference of two input words.

The deconvolution generator 100 comprises a plurality (N) of memory locations M1, M2, M3, M4 ... MN-1, MN; with associated arithmetic multiplier units P1, P2, P3, P4 ... PN-1, PN. A shift register comprises N-2 serial stages S1, S2, S3, ... SN-2. The outputs of the shift register stages on respective lines 01, 02, 03 ... ON-2 are each (except the last one) coupled to the input of the next stage, and also to the inputs of the multiplier devices P2, P3, P4 ... PN-1 respectively. The output of the last shift register stage on line ON-2 is coupled via a summing device 42, a delay unit 44 and line 45 to the input of the multiplier device PN, with line 45 also coupled via a device 46 which provides multiplication by a forgetting factor f to a plus input of the summing device 42 (A forgetting factor is a number between 0 and 1, tuned to the particular unknown system being controlled.) For lack of a priori information on the controlled system, the forgetting factor is usually taken as 0.5. Note that the input of stage S2 and the input of memory P2 could be connected to line 39 at the output of the summing device 38 instead of to line O1, with no difference in the operation.)

There are a number of arithmetic summing devices, including device A1 having its output coupled to the input of the multiplier device P1, and summing devices A2, A3, ... AN-1 having plus and devices A2, A3, ... AN-2 have plus inputs from the outputs of devices A3, ... AN-1, respectively. The summing device A1 has a plus input coupled to a line 77. A summing device 38 has one plus input from the output of the first shift register stage S1 on line O1, and another plus input from line 37. The signal supplied at line 37 by a circuit (not shown) has a value of $a_0$ at the initial clock pulse ($n=0$), a value of $-\alpha a_0$ at the next clock pulse ($n=1$) and is zero thereafter. Mathematically this is denoted by ($a_0 \delta(n) - \alpha a_0 \delta(n-1)$).

The output u(n) of the summing device 38 on line 39 is supplied via a zero order hold device 40 and line 41 to an input of the unknown system 50. The zero order hold device is a circuit which responds to a digital input signal at the beginning of each clock interval, converts the value of the digital word to an analog voltage level, and then holds its output constant at that voltage level for the duration of the clock interval. The analog signal on line 41 is the control signal u(t) of system 50, which responds with an analog output signal u(t) on line 51.

The output on line 51 is sampled by a device 52, shown as a switch, which includes an analog-to-digital converter. The analog signal is sampled at the occurrence of each clock pulse, at intervals T. The resulting digital word appears with the binary digits in parallel on line 53. This digital word, signal $c_n$, is the feedback input to the Universal Controller, and is supplied to a minus input of a summing device 72. (In FIG. 1 the digital output line 53 is shown connected via dashes to the feedback line 53', since in general a feedback unit 102 shown in FIG. 3 may be inserted here to provide a feedback factor H. In the embodiment of FIG. 1, H is equal to one, which corresponds to a direct connection.) A digital command signal r(n) on line 11 is connected to a plus input of the summing device 72. The output of the summing device 72 on line 73 is an error signal e(n) which is supplied to a unit 74, where it is multiplied by a factor $(1-\alpha)a_0$. The output of unit 74 is coupled via a delay device 76 and line 77 to the plus input of the summing device A1.

Line 11 is also connected to an input of a model system 80, and in the system 80 via two delay devices 82 and 84 to a plus input of a summing device 86. The output of the summing device 86 is coupled via a delay device 88 to the inputs of two units 90 and 92. In unit 90 the signal is multiplied by a factor $\alpha$, and the output is connected to another plus input of the summing device 86 to form a feedback loop. In unit 92 the signal is multiplied by a factor $(1-\alpha)$ to provide the output signal $y_m$ of the model system 80 on line 93, which is connected to a minus input of a summing device 94.

The summing device 94 has a plus input from line 53 for the digital signal c(n). Its output on line 95 provides a model-difference signal $e_m(n)$, which is equal to $(c(n) - y_m(n))$.

The circuit 100 between line 77 and device 38 is a deconvolution generator, which deconvolutes the signal supplied at line 77 with the model-difference signal at line 95 to give the control signal at line 39. The first non-zero value of the signal on line 95 is stored in memory M1 in inverted form as $1/e_m(1)$, and on successive clock pulses the values are stored without inversion) as words $e_m(2), e_m(3), e_m(4), \ldots e_m(N-1), e_m(N)$ in the memories M2, M3, M4 ... MN-1, MN respectively. This requires some sort of steering circuit arrangement (not shown) controlled by the clock to steer the successive words into the proper memory locations.

$$e_m(n) = = a_0[(g_n - g_{n-2}) - \alpha(g_{n-1} - g_{n-2})]$$

OPERATION

To explain the operation, assume a step signal r(n) at line 11 which at time $t=0$ has a value zero, and just after the initial time ($t=0^+$) and all clock pulses thereafter ($t=nT^+$, $n \geq 0$), has a value "one". At the time ($t=0^+$), the value of c(0) on line 53 is zero. Therefore the signal on line 73 is 1, which is amplified through device 74 to supply an input of $(1-\alpha)a_0$ to the delay unit 76. The starter signal as line 37 is $a_0$. The signal at the input of summing device 38 is "zero". Therefore the signal at line 39 is $a_0$, which is converted to analog form in the device 40 and applied at line 41 as an initial input to the system 50. All the other signal levels are "zero" at $t=0^+$, including $e_m(0)$ on line 95, the signal levels at the outputs of all the delay units, and the contents of all of the memory locations and the shift registers.

After the first clock pulse ($n=1$ and $t=T^+$), the signal $r_n$ which appears on line 11 is again "one", and is assumed to remain "one" from here on. The signal $a_0$ has been applied to the system 50 for one sampling period T. providing the value $c_1 = g_1 a_0$ on line 53 at the minus input of the summing device 72 and the plus input of the summing device 94. Since the signal on line 93 is still "zero", the value loaded into the memory location M1 is $1/g_1 a_0$. The value on line 73 is $1 - g_1 a_0$, which is amplified through the device 74 to supply a signal of $(1-\alpha)a_0(1-g_1 a_0)$, to the delay unit 76. The output of unit 76 is now $(1-\alpha)a_0$, which was the input to unit 76 at the previous clock pulse. Since the signal at the minus input of the summing device A1 is "zero", the output thereof to multiplier P1 is $(1-\alpha)a_0$, which is multiplied by $1/g_1a_0$ to give $(1-\alpha)/g_1$ at the input of the shift register stage S1. This signal may be denoted as $u_2$, namely, $$u_2 = (1-\alpha)/g_1$$

which will appear at the output of device S1 after the next clock pulse. At the present time, the output of device S1 is "zero", and the signal level at lines 37, 39 and 41 is $-\alpha a_0$.

After the second clock pulse (n=2 and t=2T+), the digital output of the system 50 at line 53 is $g_2a_0 + g_1(-\alpha a_0)$, where $g_1$ and $g_2$ are unknown characteristics of the system being controlled. In the model system 80, the signal levels at the outputs of devices 82, 84 and 86 are "one" and the signal at the output of device 88 is "zero". Therefore, the signal at line 93 is "zero". Hence the value loaded into the memory M2 is $(g_2-\alpha g_1)a_0$, which is the signal level at line 95. The signal at line 73 is $1-(g_2-\alpha g_1)a_0$, which is amplified through the device 74 to supply a signal of $(1-\alpha)a_0[1-(g_2-\alpha g_1)a_0]$ to the delay unit 76. The signal at line 77 is now $(1-\alpha)a_0(1-g_1a_0)$. The signal level at line O1 is $(1-\alpha)/g_1$, which is multiplied by the content of memory M2 to give an input $(1-\alpha)(g_2-\alpha g_1)a_0/g_1$ to the summing device A2. The output of device A3 is still "zero" because the signal at the output of device S2 is "zero". Therefore, the signal level at the minus input of device A1 is again $(1-\alpha)(g_2-\alpha g_1)a_0/g_1$. The signal at the input of multiplier P1 is now $(1-\alpha)a_0[1-g_1a_0-(g_2-\alpha g_1)/g_1]$, which is multiplied by the content of memory M1 and then input to device S1. The input signal at device S1 may be denoted by $u_3$, which is found to be:

$$u_3 = (1-\alpha)[1-g_1a_0-(g_2-\alpha g_1)/g_1]/g_1$$

which will appear on line O1 at the output of device S1 after the next clock pulse. The signal level at line 37 is now "zero" and will remain "zero" from here on. The signal level at lines 39 and 41 is thus $(1-\alpha)/g_1$, which is the same as the signal level at line O1.

After the third clock pulse (n=3 and t=3T+) the digital output of the system 50 at line 53 is $g_3a_0 + g_2(-\alpha a_0) + [(1-\alpha)/g_1]$, where $g_1$, $g_2$ and $g_3$ are unknown characteristics of the system being controlled. In the model system 80, the signal levels at the outputs of devices 82, 84 and 88 are "one" (which is the previous signal level at the inputs of these delay units), and the signal at the input of device 88 is $1+\alpha$. Therefore, the signal at line 93 is $1-\alpha$. Hence the value loaded into the memory M3 is $(g_3-\alpha g_1)a_0$, which is the signal level at line 95. The signal at line 73 is $\alpha-(g_3-\alpha g_2)a_0$, which is the difference between the signal at line 11 and the signal at line 53, and which is amplified through the device 74 to supply a signal of $(1-\alpha)a_0[1-(g_3-\alpha g_2)a_0]$ to the delay unit 76. The signal at line 77 is now $(1-\alpha)a_0[1(g_2-\alpha g_1)a_0]$. The signal level at line O1 is $(1-\alpha)[1-g_1a_0-(g_2-\alpha g_1)/g_1]/g_1$, which is multiplied by the content of memory M2 to give $(1-\alpha)a_0[1-g_1a_01-(g_2-\alpha g_1)/g_1](g_2-\alpha g_1)/g_1$ as the output of multiplier P2. The output of device S2 is now $(1-\alpha)/g_1$, which is multiplied by the content of memory M3 to give $(1-\alpha)a_0(g_3-\alpha g_2)/g_1$ as the output of multiplier P3. The output of device A4 is still "zero" because the signal at the output of device S3 is "zero". Therefore, the signal level at the minus input of device A1 is the sum of the outputs of devices P3 and P2, which is $(1-\alpha)a_0[(g_3-\alpha g_2)/g_1 + (1-g_1a_0)(g_2-\alpha g_1)/g_1 - (g_2-\alpha g_1)^2/g_1^2]$. The signal level at the input of multiplier P1 is now $(1-\alpha)a_0[1-(g_3-\alpha g_2)/g_1 - (g_2-\alpha g_1)/g_1 + (g_2-\alpha g_1)^2/g_1^2]$, which is multiplied by the content of memory M1 to give an input $u_4$ to device S1, where $u_4$ is found to be:

$$u_4 = (1-\alpha)[1-(g_1-\alpha g_2)/g_1 - (g_2-\alpha g_1)/g_1 + (g_2-\alpha g_1)^2]/g_1.$$

This signal will appear on lines O1, 39 and 41 immediately after the next clock pulse.

After the fourth clock pulse (n=4 and t=4T+), the digital output of the system 50 at line 53 is $$c(4) = g_4a_0 + g_3(-\alpha a_0) + g_2[(1-\alpha)/g_1] + g_1(1-\alpha)[(1-g_1a_0-(g_2-\alpha g_1)/g_1]/g_1,$$
$$= 1 - \alpha^2 + a_0(g_4-g_1) - \alpha a_0(g_3-g_1)$$

where $g_1$, $g_2$, $g_3$ and $g_4$ are unknown characteristics of the system being controlled. In the model system 80 the signal levels at the outputs of devices 82 and 84 are "one" (which is the previous signal level at the inputs of these delay units), the signal level at the output of device 88 is $1+\alpha$, (the previous level at its input), and the signal at the input of device 88 is $1+\alpha+a^2$. Therefore, the signal at line 93 is $1-\alpha^2$. Hence the value loaded into the memory M4 is $a_0(g_4-g_1) - \alpha a_0(g_3-g_1)$, which is the signal level at line 95. The signal at line 73 is $a^2 - a_0(g_4-g_1) + \alpha a_0(g_3-g_1)$, which is the difference between the signal at line 11 and the signal at line 53, and which is amplified through the device 74 to supply a signal of $(1-\alpha)a_0[\alpha^2 - a_0(g_4-g_1) + \alpha a_0(g_3-g_1)]$ to the delay unit 76. The signal level at line 77 is now $(1-\alpha)a_0[\alpha-(g_3-\alpha g_2)a_0]$. The signal level at line O1 is now $(1-\alpha)[1-(g_3-\alpha a_2)/g_1-(g_2-\alpha g_1)/g_1+(g_2-\alpha g_1)^2/g_1^2]/g_1$. which is multiplied by the content of memory M2 to give $(1-\alpha)(g_2-\alpha g_1)a_0[1-(g_3-\alpha g_1)/g_1-(g_2-\alpha g_1)/g_1+(g_2-\alpha g_1)^2/g_1^2]/g_1$, $(g_2-g_1)^2/g_1^2]/g_1$, as the output of multiplier P2. The output of device S2 is now $(1-\alpha)[1-g_1a_0-(g_2-\alpha g_1)/g_1]/g_1$, which is multiplied by the content of memory M3 to give $a_0(g_3-\alpha g_2)(1-\alpha)[1-g_1a_0-(g_2-\alpha g_1)/g_1]/g_1$ as the output of multiplier P3. The output of device S3 now is $(1-\alpha)/g_1$, which is multiplied by the content of memory M4 to give $a_0[(g_4-g_1)-\alpha(g_3-g_1)](1-\alpha)/g_1$ as the output of multiplier P4. The output of device A5 is still "zero" because the signal at the output of device S4 is "zero". Therefore, the signal level at the minus input of device A1 is the sum of the outputs of devices P4, P3 and P2. The signal level at the input of multiplier P1 is the difference between the signal on line 77 and the signal at minus input of device A1. The signal at the input of device S1 is the product of the signal at the output of device A1 and the content of memory M1. This signal is denoted by $u_5$ and can be expressed as:

$$u_5 = [\alpha - (g_3 - \alpha g_2)a_0 - (g_2 - \alpha g_1)/g_1 +$$
$$(g_2 - \alpha g_1)(g_3 - \alpha g_2)/g_1^2 + (g_2 - \alpha g_1)^2/g_1^2 -$$
$$(g_2 - \alpha g_1)^3/g_1^3 - (g_3 - \alpha g_2)(1 - g_1a_0)/g_1 +$$
$$(g_3 - \alpha g_2)(g_2 - \alpha g_1)/g_1^2 -$$
$$(g_4 - g_1)/g_1 + \alpha(g_3 - g_1)/g_1](1 - \alpha)/g_1.$$

This signal will appear on lines O1, 39 and 41 immediately after the next clock pulse.

After the fifth clock pulse (n=5 and t=5T+), the digital output of the system 50 at line 53 is $$c(5) = g_5 a_0 - g_4 a a_0 + g_3 u_2 + g_2 u_3 + g_1 u_4,$$

and the output of the model system 80 at line 93 is:

$$y_m(5) = 1 - \alpha^3.$$

The difference between the model output and the system output is:

$$e_m(5) = a_0[g_5 - g_2 - \alpha(g_4 - g_2)],$$

which is loaded into memory M5. Continuing in this fashion, one can see that after the nth clock pulse, the output of the model 80 at line 93 is:

$$y_m(n) = 1 - \alpha^{n-2},$$

and the difference between the model output at line 93 and the system output at line 53, as measured at 95 is=

$$e_m(n) = a_0[g_n - g_{n-3} - \alpha(g_{n-1} - g_{n-3})].$$

The digital output of the system 50 at line 53 is $$c(n) = g_n a_0 - g_{n-1} a a_0 + g_{n-2} u_2 + \ldots + g_2 u_{n-2} + g_1 u_{n-1}.$$

NOTES

Note that the characteristics of the controlled system, $g_1, g_2, g_3, \ldots g_n$ need not be known. The fact that $e_m(n)$ diminishes as n increases is guaranteed by the convergence of the $g_n$ sequence and the smallness of $a_0$. The smallness of the sampling period (the interval between the clock pulses) also contributes to the smallness of $e_m(n)$ by making $(g_n - g_{n-3})$ and $(g_{n-1} - g_{n-3})$ small. When n is greater than N (the number of memory locations) the controller stores no more new output errors but in effect approximates $e_m(n)$ by $f^{n-N} e_m(N)$. This can be done because for sufficiently large N (i.e., the transient response of the controlled system occurred within NT), $e_m(n)$ is sufficiently small so that the would-be contribution to the next-step control $u_{n+1}$ by $e_m(n)$ is insignificant, and the slight error introduced by the approximation is compensated by the feedback control loop.

The parameter $\alpha$ determines the speed of response of the model system to the reference input. To see this, let the input (r) be a constant "one". The output of the model immediately after the nth clock pulse is $y_m(0) = y_m(1) = 0$ $y_m(n) = 1 - \alpha^{n-2}$; for $n \geq 2$ We see that as long as $0 < \alpha < 1$, $y_m(n)$ approaches 1 as n increases. The larger the value of $\alpha$(say $\alpha = 0.99999$), the slower the output $y_m(n)$ approaches the final value of 1. If $\alpha = 0.1$, then at n=3 the output of the model is already 90% of the final value, and at n=4, 99.9%. Thus $\alpha = 0.1$ gives a very fast model for a lot of applications. We want the controlled system to perform like the model system, and we adjust $\alpha$ in devices 90 and 92 to get the kind of model we want. The factor $(1-\alpha)$ in unit 74 lets the controller know what kind of model system it is following.

The above explanation of the operation assumed value of r(n)=1 after t=0. For values of r(n) in general, the equations are $$y_m(n) = \sum_{k=0}^{n-3} (1-\alpha)\alpha^{n-k-3} r(k) = \sum_{k=3}^{n} (1-\alpha)\alpha^{k-3} r(n-k)$$

$e_m(n)$ = still the same as in the case of $(r(n) = 1)$
$= e_m(n) = a_0[g_n - g_{n-3} - \alpha(g_{n-1} - g_{n-3})].$
$c(n) = y(n) + e_m(n)$ The fact that the output error $e_m(n)$ is independent of the input r(n) is a significant feature of the invention. Another feature is that it is not necessary to know the plant transfer function in order to make $e_m(n)$ small and quickly vanishing. Still another feature is the fact that this algorithm can be implemented by a simple logical network without software.

ALTERNATIVES

Functions of the synchronous sequential network can also be realized by a microprocessor or a computer. In a microprocessor or computer realization, software or programmed computation is involved. The computation time required to generate the control variable for each sampling period is orders of magnitude longer than that of the logical network. The software version is also prone to numerical errors. The usefulness of the software version is thus limited to systems with low natural frequencies so that the sampling period can be long and the number of memory slots required for the impulse-response sequence can be few.

CONTROL VIA DECONVOLUTION

Figure 2:
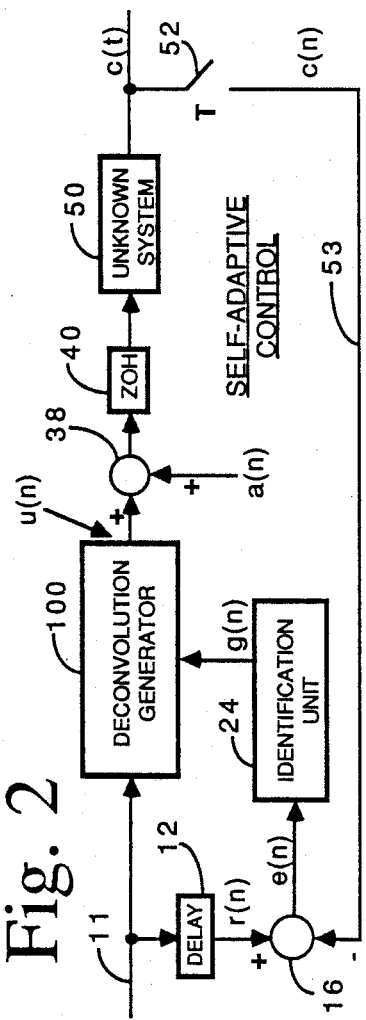
FIG. 2 is a general block diagram of a self-adaptive control system by deconvolution, as covered in a copending patent application.
Figure 3:
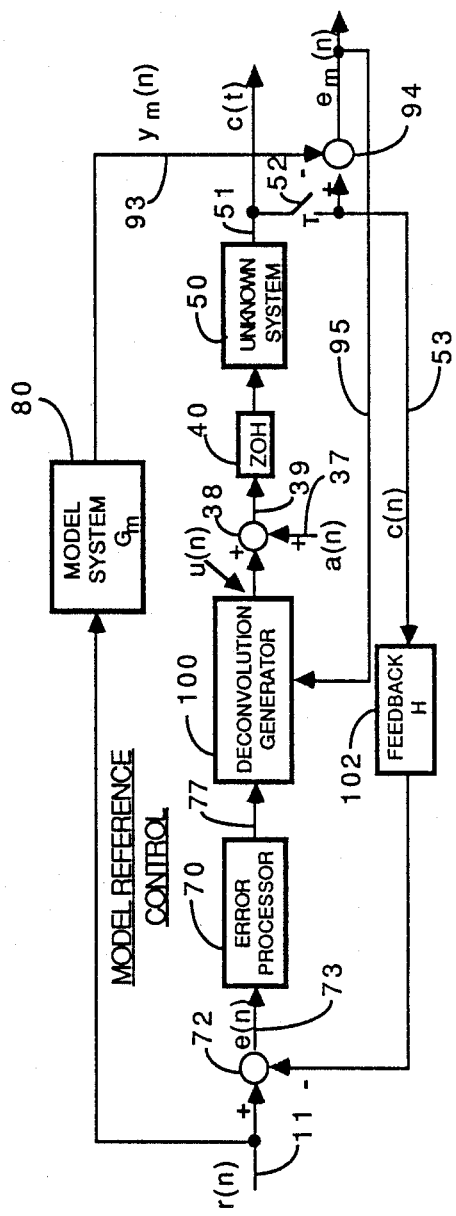
FIG. 3 is a more general block diagram of the model reference control system of FIG. 1.

FIGS. 2 and 3 are block diagrams of two systems which use real-time deconvolution to generate a desired control signal to an unknown plant, in a feedback configuration. FIG. 2 shows a system using self-adaptive control, as covered by our co-pending patent application titled "Smart Controller", Ser. No. 07/229,590 filed Aug. 8, 1988. FIG. 3 shows a "Universal Controller" system using model reference control as described herein and shown in more detail in FIG. 1. In both systems a deconvolution generator 100 provides a digital control signal u(n) which is converted to an analog signal via a zero order hold unit 40 to control the unknown system 50. A continuous output signal c(t) is converted to a digital signal c(n) to provide a feedback signal which is subtracted from a digital reference signal r(n) to provide an error signal e(n), and this error signal is used to generate an input signal to the deconvolution generator. In both systems, a starter signal is supplied as an initial control signal to the unknown system, via a summing device 38 coupled between the out of the deconvolution generator and the zero hold unit.

In the self-adaptive control system of FIG. 2, the error signal e(n) is processed in an identification unit 24 to provide an identification signal g(n) to the deconvolution generator 100. The input command line is connected directly to the deconvolution generator, and via a delay unit 12 to provide the reference signal r(n) with two time delays. The feedback signal c(n) is subtracted from the reference signal r(n) in a summing device 16.

In the model reference system of FIG. 3, the error signal is coupled via an error processor unit 70 to the deconvolution generator. The signal on the command line 11 is used as the reference signal r(n), which is used as an input to a summing device 72, and also to the model system 80. The output signal $y_m(n)$ from the model system 80 is subtracted in the summing device 94 from the signal c(n) to provide one input to the deconvolution generator 100. FIG. 3 shows a feedback unit 102, having a feedback factor h (in FIG. 1 h is made equal to "one" to reduce the number of adjustable parameters, and a direct connection is shown for the digital signal from device 52 to device 72). The feedback signal is subtracted from the reference signal r(n) in the summing device 72, to provide the error signal e(n) which is coupled via a unit 70 to provide another input to the deconvolution generator.

If the feedback factor is chosen as $H = 1 - \alpha$, then
$e_m = a_0[g_n - \alpha g_{n-1} - g_{n-3}]$.

If the feedback factor is chosen as $H = \alpha/(1-\alpha)$, then
$e_m = a_0[g_n - \alpha(g_{n-1} - g_{n-3})]$.

Both cases give good control systems with simpler formulas for $e_m(n)$, but neither has an undisputed advantage over the choice of H=1. It was therefore decided to use H=1 for the embodiment of FIG. 1.

It is understood that certain modifications to the invention as described may be made, as might occur to one with skill in the field of the invention, within the scope of the appended claims. Therefore all embodiments contemplated hereunder which achieve the objects of the present invention have not been shown in complete detail. Other embodiments may be developed without departing from the scope of the appended claims.

What is claimed is:

1. A controller for controlling a system without prior knowledge of the system transfer function, a continuous-time system output signal c(t) on a system output line being a function of said transfer function and a continuous control input signal u(t) on a system input line;

wherein said controller comprises digital apparatus operating on signals in the form of digital words having a predetermined number of binary digits, including deconvolution means, model system means, a source of clock pulses recurring at intervals equal to a sampling period T, a number (n) being the number of clock intervals from an initial time zero, sampling means coupled to said system output line for converting said continuous-time system output signal c(t) to digital system output signals c(n) comprising digital words occurring at times nT on a digital output line coupled to provide feedback signals on a feedback line, a reference input line on which reference signals r(n) are supplied as digital words occurring at times nT;

a controller output line, the output of the controller at the controller output line being a control sequence of control signal u(n) which are converted to the continuous signal u(t) at said system input line, starter means for applying a digital starter signal at said controller output line, said starter signal having a nonzero value only for a given number of clock intervals beginning with the initial time;

first error detection means having inputs from the reference input line and the feedback line and output to a first error line for subtracting the feedback signals from the reference signals r(n) to provide error signals e(n) at the first error line;

said model system means having an input coupled to the reference input line and an output to supply model output signals $y_m(n)$ to a model output line, second error detection means having inputs from the model output line and the digital output line and output to a model-error line for subtracting the model output signals from the digital system output signals to provide a sequence of model difference signals $e_m(n)$ at the model-error line;

said deconvolution means having first and second inputs and an output to the controller output line, input means coupled between said first error line and the first input of the deconvolution means, said model-error line being coupled to the second input of the deconvolution means, the input means and the model system means both having delay means and amplification factors related to the starter signal, and wherein the deconvolution means includes means including memory means for deconvolving the model difference signals and signals from the input means to provide the control sequence of control signal u(n).

2. A controller according to claim 1, wherein the memory means of the deconvolution means comprises N memory locations Mn (n=1 to N) which at the initial time have words of value zero stored therein, the memory locations being coupled to the model-error line to store the sequence of model difference signals $e_m(n)$, with each element $e_m(n)$ of the sequence output at a corresponding sampling instant and stored subsequently in a corresponding one of said memory locations Mn, except for the first memory location where the inverse of $e_m(1)$ is stored (if $e_m(1)$ is zero, then the first nonzero element of the sequence), means including shift-register means and arithmetic means coupled between said first input and the controller output line with connections to the memory locations, for generating a sequence of next-step control signals $u_{n+1}$ by the deconvolution of a transformed error sequence and the sequence of model difference signals, each control signal $u_{n+1}$ being generated during the time $nT^+$ that the corresponding model difference signal $e_m(n)$ ($e_m(1)$ to $e_m(N)$) is being stored in the corresponding memory location Mn.

3. A controller according to claim 2, which includes delay units, each of which is an IC circuit for storing one digital word with parallel inputs and parallel outputs triggered by a clock pulse to store a word from the parallel inputs which then is present at the parallel outputs until the next clock pulse to thereby provide a delay of one clock interval;

wherein said starter signal has a value equal to $a_0$ at the initial time, a value equal to $-\alpha a_0$ at time T, and a value of zero at time 2T and after, $a_0$ being a predetermined parameter and $\alpha$ being a predetermined parameter between "zero" and "one";

wherein said input means comprises amplifier means and one of said delay units, with the amplifier means having a gain of $-(1-\alpha)a_0$;

wherein said model system means includes a model-system adder circuit, two of said delay units in tandem between the input of the model system and an input of the model-system adder circuit, one of said delay units coupled between an output of the model-system adder circuit and a junction point, first model-system amplifier means having a gain of $(1-\alpha)$ coupled between said junction point and the output of the model system, and second model-system amplifier means having a gain of $\alpha$ coupled between said junction point and another input of the model-system adder circuit.

4. A controller according to claim 3, wherein said shift-register means comprises (N-2) of said delay units to provide (N-2) shift-register stages, said arithmetic means of the control means comprises N multiplier circuits numbered one to N inclusive, adder circuits numbered two to N-1 inclusive and a subtracter circuit;

each shift-register stage having an input and an output, each multiplier circuit having an input and an output, each adder circuit having first and second inputs and an output;

the subtracter circuit having a plus input and a minus input with signals at the minus input being subtracted from signals at the plus input, the subtracter circuit having the plus input connected to the first input of the deconvolution means and an output connected to an input of multiplier circuit number one, the output of multiplier number one being connected to the input of shift-register stage number one:

the output of shift-register stage number one being said controller output line, and also being connected to the input of shift-register stage number two and to the input of multiplier circuit number two;

the output of shift-register stage number two being connected to the input of shift-register stage number three and to the input of multiplier circuit number three, the output of each successive shift-register stage being connected to the input of the next higher numbered shift-register stage and the input the next higher numbered multiplier circuit, up to the output of shift-register stage number (N-3) being connected to the input of shift-register stage number (N-2) and to the input of multiplier circuit number (N-2);

the output of shift-register stage number (N-2) being connected to the input of multiplier circuit number (N-1), and also being coupled via an adder circuit and one of said delay units in tandom to the input of multiplier circuit number N, with the output of the last said delay unit coupled via a circuit for multiplying by a factor f (f being constant between 0 and 1) to another input of the last said adder circuit;

the adder circuits being connected to tandem with adder circuit number (N-1) having its first and second inputs connected to the outputs of multiplier circuits number N and (N-1) respectively, adder circuit number (N-2) having its first input connected to the output of adder circuit number (N-1) and its second input connected to the output of multiplier circuit number (N-1), the output of each successive adder circuit having its first input connected to the output of the next higher numbered adder circuit and its second input connected to the output of the like numbered multiplier circuit, up to the first input of adder circuit number two being connected to the output of adder circuit number three and its second input connected to the output of multiplier circuit number two;

the output of adder circuit number two being connected to the minus input of the subtracter circuit;

the multiplier circuits being each coupled to a like numbered one of said memory locations (e.g. multipler circuit number one is coupled to memory location number, etc., up to multipler circuit number N coupled to memory location number N) to multiply the contents of each memory location by a signal at the input of the like numbered multiplier circuit and supply the product to the multiplier output.

* * * * *

UNITED STATES PATENT AND TRADEMARK OFFICE
CERTIFICATE OF CORRECTION

PATENT NO. : 4,970,638

DATED : November 13, 1990

INVENTOR(S) : Hsi-Han Yeh et al

It is certified that error appears in the above-identified patent and that said Letters Patent is hereby corrected as shown below:

On the title page:

ABSTRACT, line 8, "control" should read ---controlled---.

Col 2, line 18, "model" should read ---Model---.

Col 2, line 21, "model" should read ---Model---.

Col 2, line 66, "Sumano" should read ---Sugano---.

Col 3, line 14, after "banks" a comma should be inserted.

Col 3, line 49, after "subsystems" a comma should be inserted.

Col 3, line 50, after "reactors" a comma should be inserted.

Col 4, line 29, after "otherwise" a comma should be inserted.

Col 6, line 30, "without inversion) should read ---(without inversion)---.

Col 7, line 57, "$(1-\alpha)a_0[1-(g_3-\alpha g_2)a_0]$" should read ---$(1-\alpha)a_0[\alpha-(g_3-\alpha g_2)a_0]$---.

Col 7, line 59, "$[1(g_2-\alpha g_1)a_0].$" should read ---$[1-(g_2-\alpha g_1)a_0].$---.

Col 7, line 62, "$g_1 a_{01}-(g_2-\alpha g_1)/g_1](g_2-\alpha g_1)/g_1$" should read ---$g_1 a_0-(g_2-\alpha g_1)/g_1](g_2-\alpha g_1)/g_1$---.

UNITED STATES PATENT AND TRADEMARK OFFICE
CERTIFICATE OF CORRECTION

PATENT NO. : 4,970,638

DATED : November 13, 1990

INVENTOR(S) : Hsi-Han Yeh et al

It is certified that error appears in the above-identified patent and that said Letters Patent is hereby corrected as shown below:

Col 8, line 4, "$g_1^2$." should read ---$g_1^2$].---

Col 8, line 10, "$[1-(g_1-\alpha g_2)$" should read ---$[1-(g_3-\alpha g_2)$---.

Col 8, line 27, "$a^2$" should read ---$\alpha^2$---.

Col 8, line 31, "$a^2$" should read ---$\alpha^2$---.

Col 8, line 37, "$(g_3-\alpha a^2)$" should read ---$(g_3-\alpha g^2)$---.

Col 8, line 41, "$/g_1+(g_2-\alpha g_1)^2/g_1^2]/g_1 \cdot (g_2-g_1)^2/g_1^2]/g_1$," should read ---$/g_1+(g_2-\alpha g_1)^2/g_1^2]/g_1$,---.

Col 10, line 56, "out" should read ---output---.

Col 11, line 17, "$H=\alpha/(1-\alpha)$" should read ---$H=-\alpha/(1-\alpha)$---.

Col 13, claim 4, line 6, "N-1inclusive" should read ---N-1 inclusive---.

Col 13, claim 4, line 19, "one:" should read ---one;---.

Signed and Sealed this

Eighth Day of September, 1992

*Attest:*

DOUGLAS B. COMER

*Attesting Officer*   *Acting Commissioner of Patents and Trademarks*